Feb. 12, 1929.
M. H. TUTTLE
1,701,647
TRANSPORTATION SYSTEM
Filed Sept. 18, 1926
4 Sheets-Sheet 2
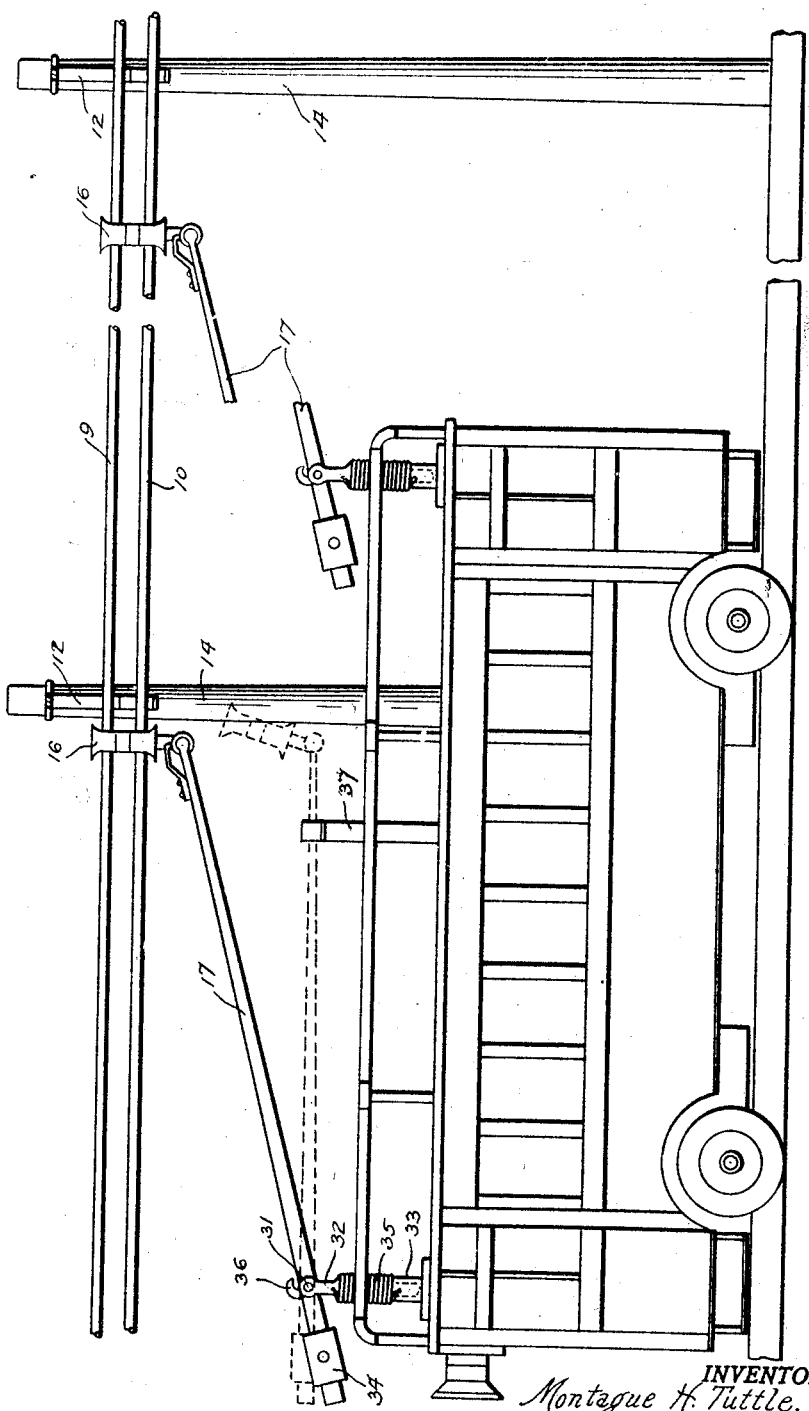
INVENTOR:
Montague H. Tuttle,
BY
F. Bourne
ATTORNEY

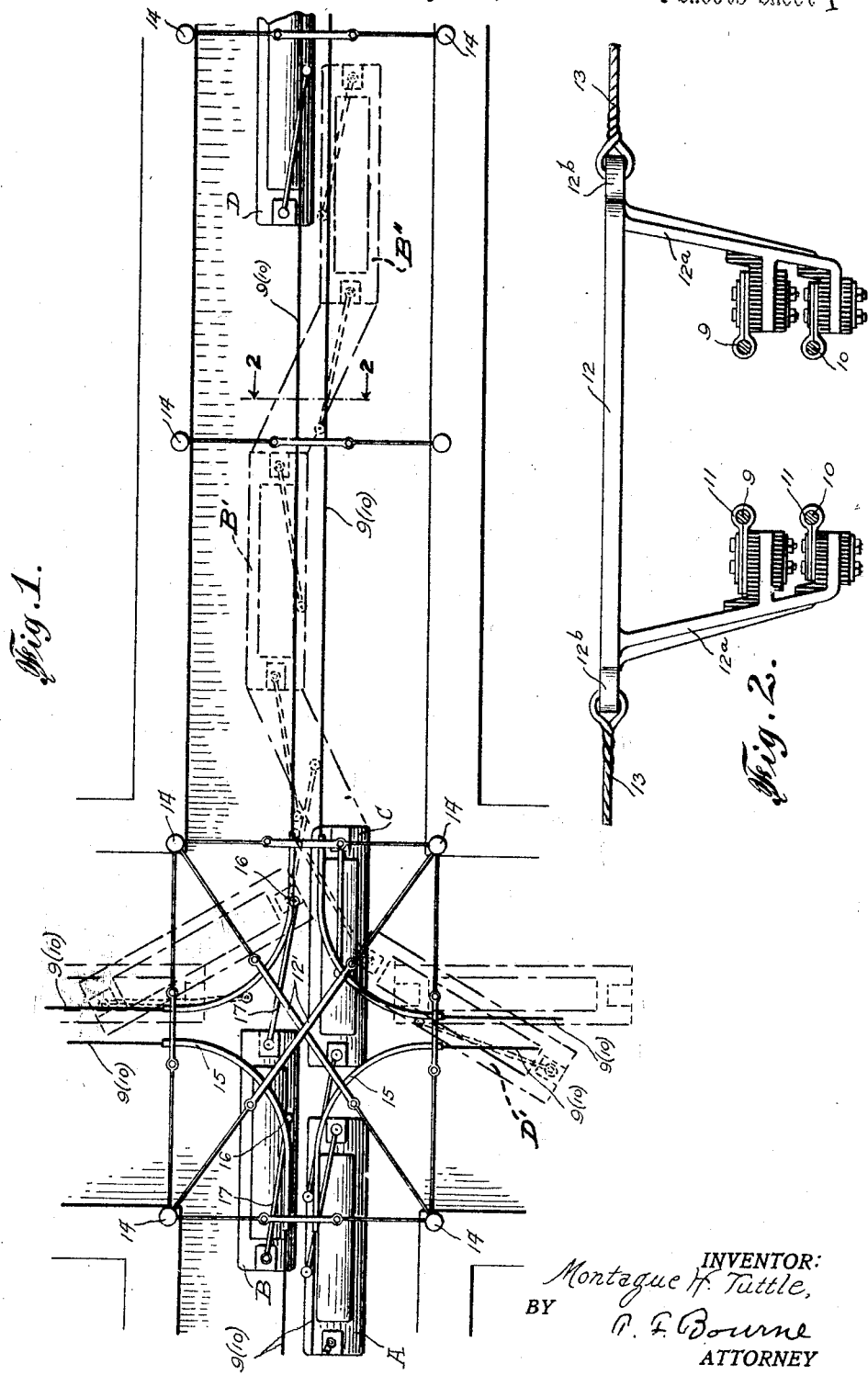

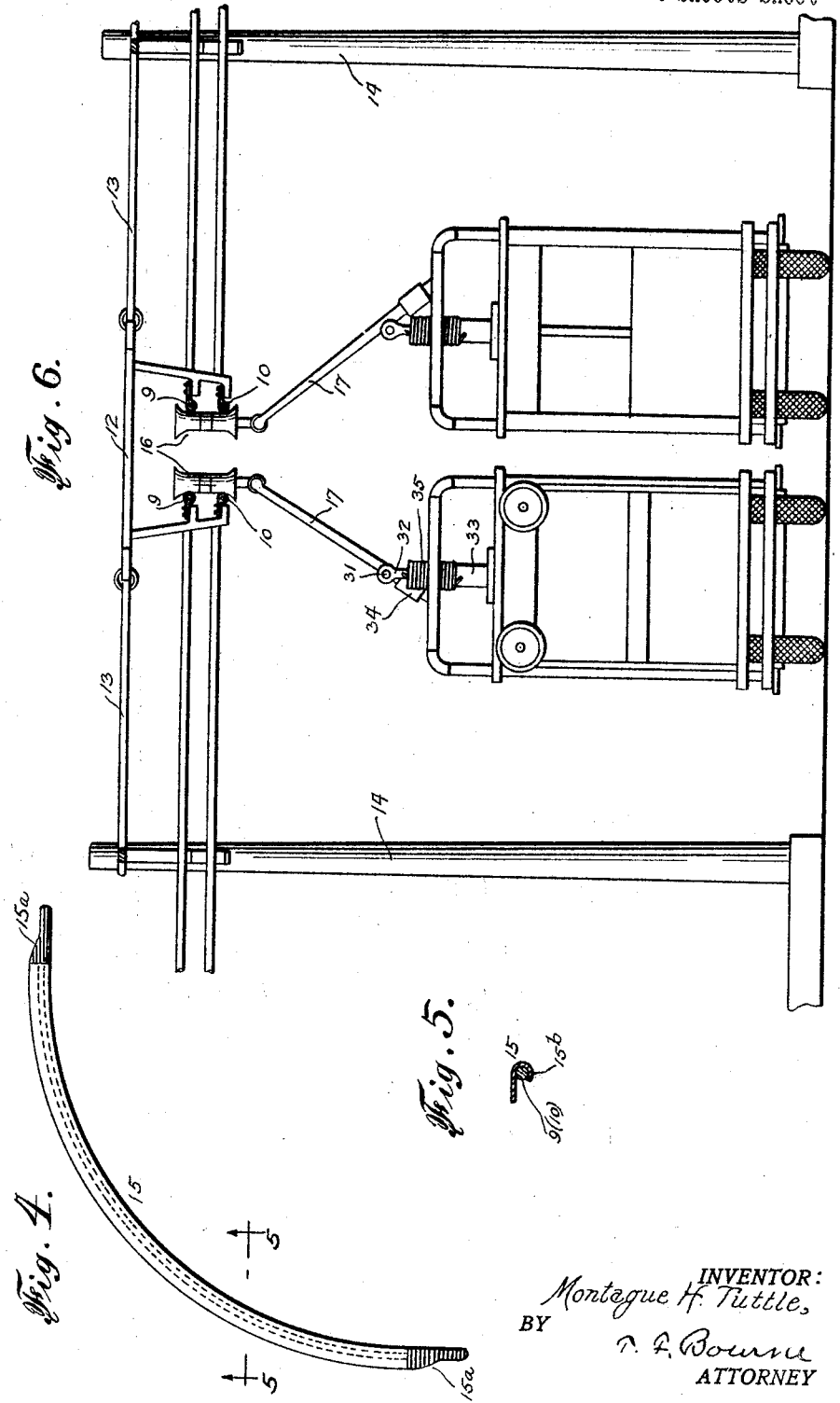

Feb. 12, 1929.
M. H. TUTTLE
1,701,647
TRANSPORTATION SYSTEM
Filed Sept. 18, 1926  4 Sheets-Sheet 4
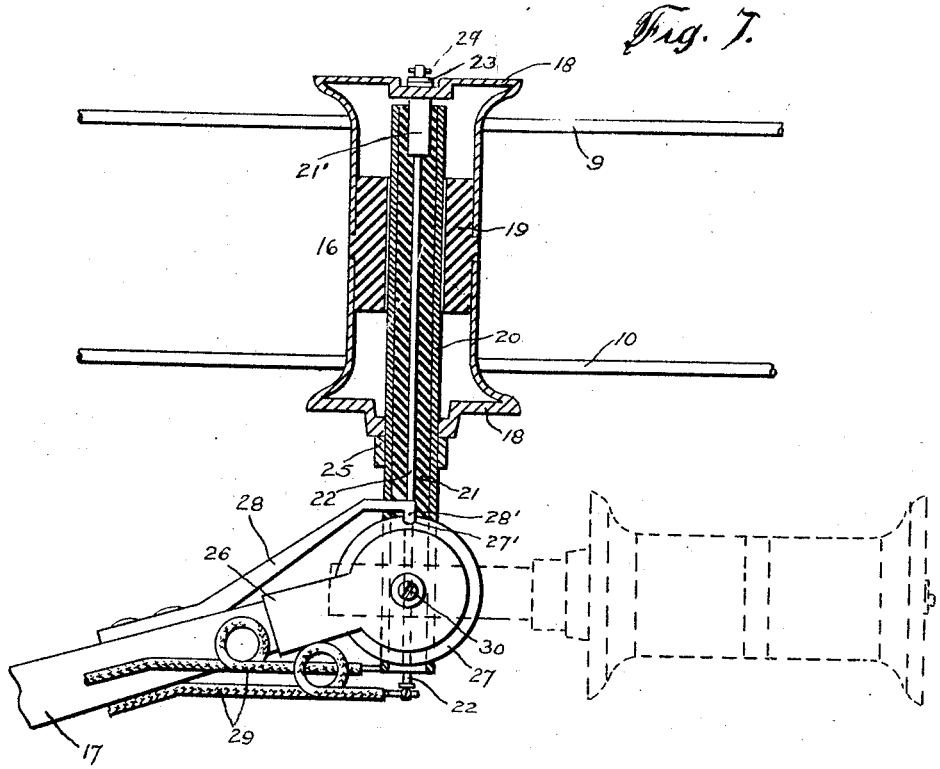
Fig. 7.
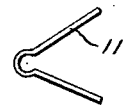
Fig. 2ª.
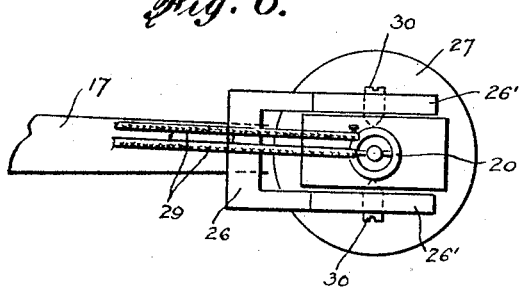
Fig. 8.
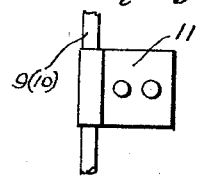
Fig. 2ᵇ.
INVENTOR:
Montague H. Tuttle,
BY P. F. Bourne
ATTORNEY Patented Feb. 12, 1929.

1,701,647

UNITED STATES PATENT OFFICE.

MONTAGUE HART TUTTLE, OF ATLANTA, GEORGIA.

TRANSPORTATION SYSTEM.

Application filed September 18, 1926. Serial No. 136,344.

This invention relates to transportation systems, and more particularly aims to provide certain new and useful improvements in what are commonly called trackless trolley systems; such as those involving the use of passenger buses or other automative vehicles for passengers or freight having definite runs or routes over streets or roads, but not as track rolling stock, nor as rolling stock carrying their own power plants such as internal combustion motors, steam boilers, storage batteries, &c.

The invention has chiefly in mind the provision of an overhead trolley system, including feed and return wires, so that the buses or other rolling stock employed and provided with propelling motors may have these motors run by current from wire and trolley elements, and a trolley system of the kind indicated which shall be simple, reliable, and relatively inexpensive to construct and maintain, and shall represent economies of rolling stock operation, shall minimize time losses on runs due to stoppages for other purposes than taking on and discharging passengers or freight, and provide other operative advantages as hereinafter pointed out or apparent.

One of the important objects of the invention is to provide a trackless trolley system whereby one vehicle may pass another vehicle going in the same direction without break in the energizing circuit for the motor of either vehicle.

Another important object is to provide a trackless trolley system whereby a vehicle may turn a corner, either to the right or left, as to follow a route branching off the main route intermediate the ends of the latter, without break in the energizing circuit for the motor of the vehicle.

Another object is to provide an overhead feed and return wire for the system whereby to facilitate the attainment of the two objects last-stated and whereby at the same time over-head switches need not be operated and indeed need not be present.

Another object is to provide a trackless trolley system wherein the arrangement of feed and return wires is such that it will be practically impossible for wind, snow or sleet storms to contact the wires directly or indirectly to form dangerous short circuits.

Another object is to provide a trackless trolley system wherein the wire and trolley coadjuvants are so constructed and so function that "jumping of the trolley," either to break the motor circuit or to short circuit a pair of feed and return wires, is practically impossible, regardless of temporary irregularities of the road-bed or the degree of abnormal swerve of a vehicle from its ideal path of travel substantially in parallellism with the line of extension of its appointed pair of feed and return wires.

Another object is to provide an improved "non-jump" type of trolley means which is adapted to bridge feed and return wires but by pressures thereagainst other than pure upward thrusts.

Another object is to provide a trolley mount, particularly adapted for the trolley just referred to, which permits flotation of the trolley in a vertical plane yet always to maintain the trolley in bridging relation to feed and return wires.

Another object is to provide a trackless trolley system wherein the wire and trolley codajuvants are so constructed and so function that a trolley-pole may be employed, and preferably a plurality of such poles, on each vehicle, operating to facilitate the attainment of all the foregoing objects of the invention, and at the same time capable of being retracted and otherwise manipulated as are trolley poles as now known.

Various other objects and advantages of the invention will be specifically pointed out or apparent hereinafter, in the course of a description of a preferred one of the various possible systems of the invention as shown in the accompanying drawings; it being understood, of course, that the system disclosed is merely illustrative of one combination and arrangement of parts calculated to attain the objects of the invention, pursuant to present preference, and hence the detailed description of such system now to be given is not to be taken as at all defining or limiting the invention itself. That is to say, the scope of protection contemplated is to be taken solely from the appended claims, interpreted as broadly as is consistent with the prior art, and with explanatory references to the specification only where a claim is ambiguous or to be impliedly limited beyond its express terms to avoid such art in order to save the validity of said claim.

In the accompanying drawings:

Fig. 1 shows said system in top plan, certain vehicle movements being indicated in broken lines;

Fig. 2 shows on an enlarged scale an end elevation of one of the transverse wire hangers, this view being, as to the feed and return wires, say a section on line 2—2 of Fig. 1;

Fig. 2ª is a detail view showing in edge elevation and in open condition one of the wire-positioning clamp-members shown similarly but in closed and compressed condition in Fig. 2;

Fig. 2ᵇ is a top plan view of the clamp-member of Fig. 2ª, showing also a part of the held wire;

Fig. 3 shows on an enlarged scale over that of Fig. 1, a passenger bus in side elevation, and also similarly parts of the trolley system serving that vehicle, this view thus being in a sense a longitudinal vertical section relative to Fig. 1 and so showing the hangers of Fig. 2 in transverse section;

Fig. 4 shows in top plan and on an enlarged scale one of the corner-turning conductor elements of Fig. 1;

Fig. 5 is a transverse section of said element, taken on the line 5—5 of Fig. 4;

Fig. 6 is a view on the same scale as Fig. 3, but a transverse vertical section relative to Fig. 1, at a point to show two oppositely travelling vehicles passing each other;

Fig. 7 is an enlarged detail view of certain of the parts shown in Fig. 3, with the trolley in axial section; and Fig. 8 is a bottom plan view of the parts shown in full lines in Fig. 7.

Similar reference characters refer to similar parts throughout the several views of the drawings.

It will be noted that in the system thus illustrated, the overhead arrangement involves a pair of feed and return wires one above the other for vehicles travelling over a certain route in a certain direction. The higher wire 9 may be the feed wire, and the lower wire 10 the return wire, in each case.

As shown best in Figs. 1, 2, 2ª and 2ᵇ, these wires 9 and 10, which may be strung say six inches apart as to vertical separation, are at intervals along their lengths embraced by the bight or loop portions of clamp-members 11 bolted in place on higher and lower shelves carried by depending extensions 12ª of hangers 12. One of these extensions 12ª has bolted on its shelves the feed and return wires for one direction of vehicle travel, and the other of said extensions has bolted on its shelves the similar wires for the opposite direction of vehicle travel. The hangers are held in place by cables 13 engaging eyes 12ᵇ and offside poles 14.

As shown in Fig. 1, where the wires branch off, as at a street corner, to provide branch routes intermediate the ends of a main route, the four corner poles, with their four suspended hangers, are also joined by diagonally extending cables and intervening longer and crossed hangers 12′. The hangers 12′ are each provided with a dependent extension (not shown) having higher and lower shelves; such extension being similar to one of those seen in Fig. 2 on a hanger 12. A wire 9 or 10, as the case may be, is given a right or left hand turn and continued to and beyond a hanger 12 at right angles to the last hanger left by said wire.

As thus turned, said wires 9 and 10 are curved circularly or so as to correspond with the curve described by the steering wheels of the vehicle in taking the corner; and in order to hold and rigidify such curved portions of the wires, elements such as shown in Figs. 1, 4 and 5 are desirably incorporated. These are strips 15 of conducting material shaped longitudinally as shown in Figs. 1 and 4, suitably ramped at opposite ends as indicated at 15ª in Fig. 4, and transversely bent to present an underlying flange indicated at 15ᵇ in Fig. 5 between which and the main part of the strip the wire turning the corner is gripped. The resulting composite conductors thus constituted are suitably secured to the shelves carried as aforesaid by the various hangers between the four poles at the turn-off, as the four poles shown at the street intersection of Fig. 1.

Each of the several vehicles, certain of which are shown at A, B, C and D in Fig. 1, carries a suitably supported trolley 16, turning on a vertical axis, and of such length between its terminal conical enlargements as to span or bridge its appointed pair of wires 9 and 10, as shown in Fig. 6. I prefer to support such trolley on the upper end of a trolley pole 17, as most clearly shown in said Fig. 6; and I also prefer to employ two trolley poles on each vehicle, and of course two trolleys, one on each pole, as shown in Figs. 1 and 3.

Referring to Figs. 7 and 8, the trolley or spool 16 is shown in detail, as the same may practicably be constructed. Two drawn or otherwise shaped hollow metal spool "halves", or cups, 18, are held in tight and secure assembly with a generally cylindrical and partially contained block 19 of suitable insulating material, by the following elements: A steel tube 20 loose in the block 19 and also in the central aperture in the lower face of lower cup 18, has secured therein an insulating rod 21 within which is imbedded a metallic conducting member 22 having near its upper end an enlargement 21′ and above that a reduced portion loosely passing through the central aperture in the upper face of upper cup 18. This reduced portion of the member 22 protrudes above said cup and is there sleeved by washers 23 and pierced by a securing pin 24. On the steel tube 20, below the lower cup 18, is fixed a collar 25; it being noted that said tube and the contained insulating rod 21 extend well below the bottom of the spool, and so as to enter the bifurcation between the tines 26′ of a metal fork 26 secured to the upper end of a trolley pole 17. Pointed screws 30 pass through such tines, and the inner ends of said screws seat in suitable recesses in opposite sides of a disc 27 through which the lower end portion of the steel tube 20 is extended and within which said tube is anchored. This disc 27 has a transverse groove 27' across its periphery, in which is impositively seated the free end or dog portion 28' of a heavy bar spring 28 anchored to the trolley pole, when the spool is upright and bridging a pair of wires 9 and 10. Beyond the lower open end of the steel tube 20, the conducting member 22 is extended sufficiently to connect thereto one of the motor wires 29 running down the trolley pole, the other of such wires being connected to the steel tube 20.

Referring to Figs. 3 and 6, each of the trolley poles is pivotally mounted at its lower end on the top of the vehicle, in a manner to have a movement about a vertical as well as a horizontal axis. Thus, each pole is rockable up and down on an axis 31, and the axis 31 is carried at the upper end of a short vertical shaft 32 rotatable in a bearing fixture 33; so that the pole is also swingable from side to side. The up and down movement of the pole is relatively a floating one, due to the presence merely of an adjustable weight 34. The sidewise movement of the pole, however, is either with or against the torsional action of a comparatively powerful coil spring 35 the lower end of which is secured to the fixture 33 and the upper end of which is secured to the short vertical shaft 32. A claw-stop may be provided as indicated at 36 in Fig. 3, this carried by the short vertical shaft 32 and so arranged as to limit upward swing of a trolley pole in response to the action of its weight 34.

When desired one or more poles may be retracted and held retracted under the hookover top of a holder-fixture such as the one shown at 37 in Fig. 3.

Operation of the system:

When any vehicle is travelling straight ahead, and not making a turn, as around a street corner, it is obvious that each trolley at the top of a pole 17 on the vehicle will be forced by the action of the spring 35, in co-action with the spool shape of the trolley, to maintain the trolley in contact with both the wires appointed to energize the motor of the vehicle. All the driver has to do is to steer the vehicle along a line so related to the plane of said wires that the torsional force of the spring will act on the pole to press the trolley against the wires. The trolley pole is not provided with means for imparting an upward spring pressure, as that is not now thought desirable, but for imparting lateral spring pressure only. This arrangement is preferred, as insuring against injury to the overhead wires, by short-circuiting or otherwise, due to snapping up of the trolley pole. In the first place, the pole cannot snap up, if the vehicle is being properly driven, on account of the manner in which the trolley and the wires are pressed together as just above described. In the second place, the only force urging the pole upward, even should the trolley become disengaged from the wires, is the weight 34. Finally, extra insurance is provided by the claw-stop 36.

It should be remembered that this weight is preferably so positioned as just to balance the weight of the longer part of the pole carrying the trolley. Such a balanced or floating trolley mount is one of the important features of the invention, for the reasons above indicated; and also because the vehicle can then travel at a rapid rate without any danger of slipping the trolley even on a road very rough and uneven from hard wear or from repairs under way.

Another insurance against any possible short-circuiting or other damage to trolley, trolley pole, or wires is resident in the arrangement shown in Figs. 7 and 8, and particularly in the pivotal mounting of the steel tube 20 by way of the screws 30, and the presence of the spring 28 and the impositive seating of the end 28' thereof in the recess 27' of disc 27. According to such arrangement, the trolley may be rotated backward, about the axis afforded by the screws 30, to become thrown to the position shown in broken lines in Fig. 7, thus to protect the wires and all the parts, should say the vehicle run off the road-bed and thereby cause undue lateral pressure of the trolley against the feed wires. Said arrangement acts also to prevent damage when a careless driver backs into the proper wires too abruptly; because then the disc 27 will rotate in the opposite direction.

When the vehicle is on a long straight run, as in the country, one of the poles may be retracted and so held by the holder-fixture 37.

The multiple pole equipment, however, permits one vehicle to pass another travelling in the same direction, whenever desired; and the multiple pole equipment, in combination with the arrangement shown to the left in Fig. 1, permits a vehicle to travel straight ahead or turn off to the right or left at a street or road intersection; all simply as the result of properly steering the vehicle and without having to stop to set or change overhead switches, or indeed without the necessity of having any such switches, as clearly shown in Fig. 1.

When a vehicle is to pass another going in the same direction the first-mentioned vehicle, as the bus A of Fig. 1, would give a certain signal, say by sounding its horn in a certain way. Thereupon the vehicle ahead, as the bus C of Fig. 1, would swerve to the left as indicated at B' sufficiently for vehicle A to pass, and then vehicle C would swing back to the right and go ahead on its normal line of travel as indicated at B''. Neither vehicle has for an instant broken the circuit energizing its motor. When the vehicle which turned out was steered for that maneuver, one of its trolleys could not help jumping from one set of wires to the other, and before the other trolley had left the first set; and similarly, when this vehicle swung back to the right again.

Note that the trolley poles suggested are very long ones, to allow for wide latitude of divergence from the normal line of travel in case of need.

As to such as intersection as that shown to the left in Fig. 1, it should likewise be clear, from all that has been said, that the two trolley poles on each vehicle insure that whether or not a vehicle is passing the intersection or turning off there to the right or left, one trolley at least is maintaining the motor energized, so that the vehicle need never depend on momentum (and hence will never be stalled, if it has to stop in a certain position at the intersection). In passing the intersection, the gap between the two elements 15 in the line of intended travel of the vehicle is unimportant, because while one trolley is passing the gap another is engaging a set of wires; in which connection note the dispositions of the two trolleys of the vehicle B. The same situation exists as to the gap between two elements 15 when a vehicle is making a left hand turn while going in either direction. In making such a left hand turn, of course, the two trolleys of the vehicle are transferred one by one and at different instants, but entirely automatically, from one set of wires to the other, as has been described above in connection with one vehicle passing another travelling in the same direction; for instance, note the dispositions of the two trolleys of the vehicle D at the location D'.

I have hereinabove, from the very beginning of this specification, described the invention with great particularity so far as adaptation to trackless trolleys is concerned, and have indeed stated that the invention more particularly relates to transportation systems whereof the rolling stock is of the non-track type. But this has been done solely for purposes of simplifying and clarifying the disclosure of the illustrative form of the invention illustrated in the drawings. Thus, I have even gone so far as to express the principal objects mentioned in the introduction, in terms of a trackless trolley system. Most if not all of such objects are also distinctly in mind in providing, as is provided and as is intended to be provided by the present invention, an improved transportation system wherein the rolling stock is track-guided; and the appended claims have been drawn with that reservation in mind. In other words, the system is eminently practical, and highly desirable, in connection with overhead power lines for trackage systems; say for city and interurban car lines, or any electric railroad of the central power station type.

Inasmuch as many changes could be made in the above constructions, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. In a transportation system including a central electric power station and including rolling stock each unit of which is propelled by its own electric motor, the combination with the vehicles comprising said units, of an overhead power distributing conductor extending along a prevised route, a second similar conductor extending at an angle to said route and along a continuation route, an intervening overhead conductor in circuit with said two first conductors, said two first conductors being for vehicles travelling in a certain direction along said routes, and a plurality of additional overhead conductors for use by vehicles travelling in the opposite direction along said routes, said additional conductors having a gap therebetween opposite said intervening conductor and the latter being permanently out of contact with said additional conductors.

2. In a transportation system including a central electric power station and including rolling stock each unit of which is propelled by its own electric motor, the combination with the vehicles comprising said units, of overhead conductors each of which forms one side of each of the legs of an L for travel in one direction on a right hand turn around a corner, other overhead conductors each of which forms the other side of each of the legs of an L for travel in the opposite direction on a left hand turn around said corner, the first mentioned conductors being in contact with one another and the second mentioned conductors being out of contact with one another.

3. In a transportation system including a central electric power station and including rolling stock each unit of which is propelled by its own electric motor, the combination with the vehicles comprising said units, of overhead conductors at an intersection of two routes, said conductors including four continuous conductors each turning one of the four corners and each out of contact with any other.

4. In a transportation system including a central electric power station and including rolling stock each unit of which is propelled by its own electric motor, the combination with the vehicles comprising said units, of an overhead conductor equipment for a street or road intersection, said equipment comprising the eight conductors for plural direction travel of vehicles along each of the four approaches to said intersection, said conductors being joined two and two by four approximately arcuately curved conductors, with the convexities of such curves all facing the midpoint of said intersection.

5. In a system of the kind described, a vehicle, a trolley mount thereon, a trolley on said mount, said mount including means for normally holding the trolley for rotation on substantially a vertical axis, and means for readjusting the trolley for rotation on another axis.

MONTAGUE HART TUTTLE.